US008547850B2

(12) United States Patent
Matsubara et al.

(10) Patent No.: US 8,547,850 B2
(45) Date of Patent: Oct. 1, 2013

(54) TRANSPORT CONTROL SERVER, NETWORK SYSTEM AND AGGREGATED PATH SETTING METHOD

(75) Inventors: Daisuke Matsubara, Tachikawa (JP); Kazuma Yumoto, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 706 days.

(21) Appl. No.: 12/637,929

(22) Filed: Dec. 15, 2009

(65) Prior Publication Data

US 2010/0149988 A1 Jun. 17, 2010

(30) Foreign Application Priority Data

Dec. 15, 2008 (JP) ................................ 2008-318325

(51) Int. Cl.
*H04J 1/16* (2006.01)

(52) U.S. Cl.
USPC ............................ 370/237; 370/232; 370/235

(58) Field of Classification Search
USPC ................................................. 370/232–237
See application file for complete search history.

(56) References Cited

U.S. PATENT DOCUMENTS 4,905,233 A * 2/1990 Cain et al. ..................... 370/237
6,735,172 B1 * 5/2004 Gibbs et al. ................... 370/235
2002/0103924 A1 8/2002 Nomura
2004/0233843 A1 * 11/2004 Barker .......................... 370/225
2006/0159021 A1 * 7/2006 Asghar et al. ................. 370/237
2010/0157807 A1 * 6/2010 Csaszar et al. ................ 370/237

FOREIGN PATENT DOCUMENTS

JP 2002-141932 5/2002

* cited by examiner

*Primary Examiner* — Hassan Kizou
*Assistant Examiner* — Ashil Farahmand
(74) *Attorney, Agent, or Firm* — Antonelli, Terry, Stout & Kraus, LLP.

(57) ABSTRACT

A transport control server, a network system, and an aggregated path setting method for avoiding congestion on the bypass destination route when an aggregated path consisting of a group of paths was bypassed (diverted) to a bypass destination route. Edge nodes measure the traffic information flowing along each path and notify the transport control server. The transport control server calculates the available capacity of bypass destination routes for each aggregated path based on this traffic information. After receiving a path add request, the transport control server assigns additional paths to the aggregated path so that the aggregated path traffic band that was assigned additional paths, does not exceed the available capacity on the bypass path. The transport control server sends an aggregated path set message to the edge nodes. The edge node complies with the aggregated path set message received from the transport control server and sets the aggregated path.

17 Claims, 13 Drawing Sheets

100
TRANSPORT CONTROL SERVER
121-128
GW21
111-118
GW11
141
GW41
131-134
GW31
151
E1
152
E2
153
E3
154
E4
161
C1
162
C2
163
C3
164
C4
165
C5
a
b
c
d
e
f
g
h
i
j
k
l 121-128
GW21
152
E2
141
GW41
154
E4
164
C4
165
C5
k
l
j
g
e
b
163
C3
d
i
161
C1
f
a
c
C2
162
h
111-118
GW11
E1
151
153
E3
GW31
131-134

100
TRANSPORT CONTROL SERVER
151
E1
152
E2
153
E3
154
E4
S301
SET ROUTE
S302
SET ROUTE
S311
SET ROUTE
S312
SET ROUTE
S313
SET ROUTE
S314
SET ROUTE
S321
CALCULATE TRAFFIC
S322
CALCULATE TRAFFIC
S323
CALCULATE TRAFFIC
S324
CALCULATE TRAFFIC
S303
TRAFFIC INFORMATION NOTIFICATION
S304
CALCULATE LINK AVAILABLE CAPACITY
S305
RECEIVE PATH ADD REQUEST
S306
CALCULATE AGGREGATED PATH
S307
SET AGGREGATED PATH
S331
SET AGGREGATED PATH

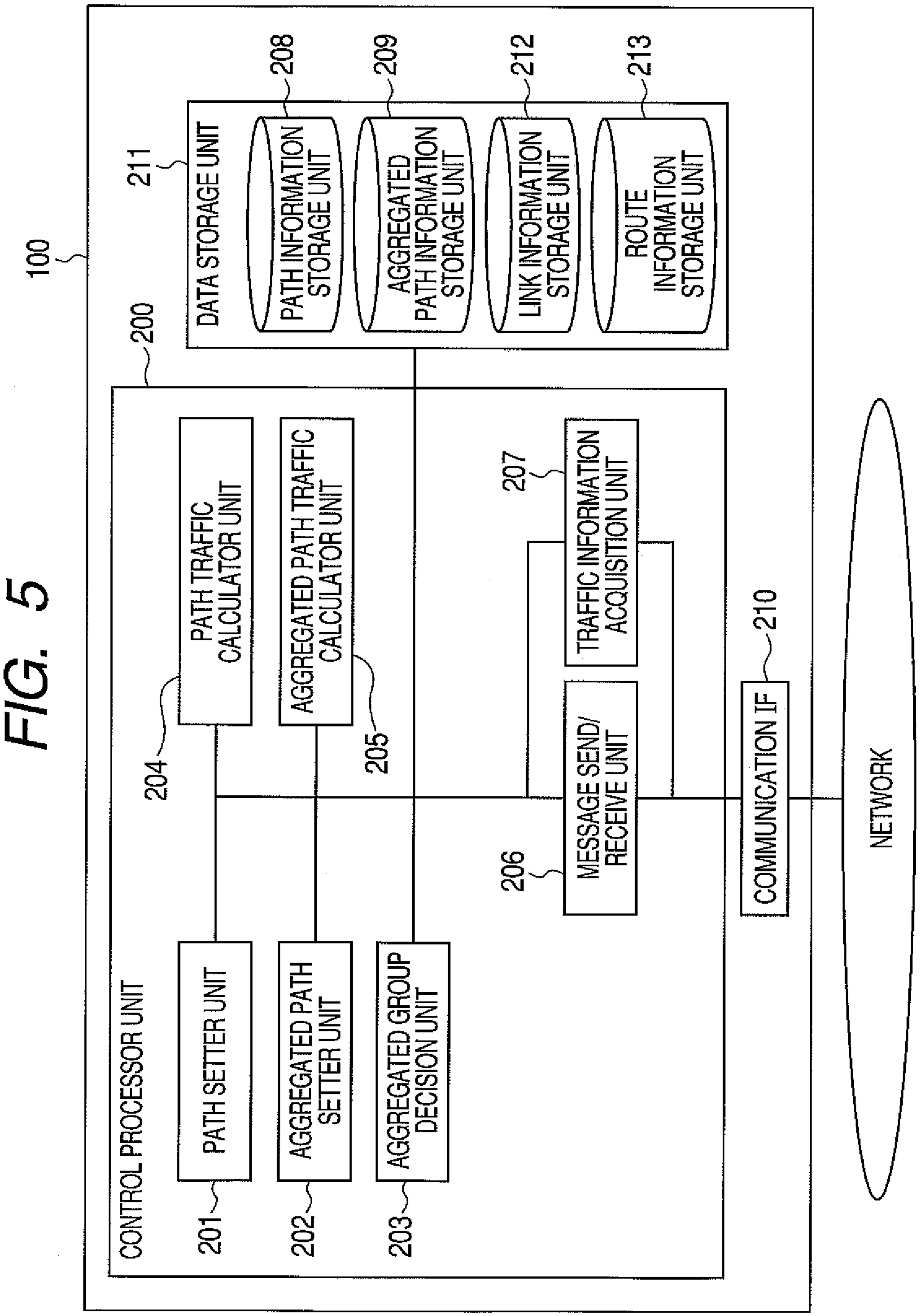
FIG. 5
100
200
211
DATA STORAGE UNIT
208
PATH INFORMATION STORAGE UNIT
209
AGGREGATED PATH INFORMATION STORAGE UNIT
212
LINK INFORMATION STORAGE UNIT
213
ROUTE INFORMATION STORAGE UNIT
CONTROL PROCESSOR UNIT
201
PATH SETTER UNIT
202
AGGREGATED PATH SETTER UNIT
203
AGGREGATED GROUP DECISION UNIT
204
PATH TRAFFIC CALCULATOR UNIT
205
AGGREGATED PATH TRAFFIC CALCULATOR UNIT
206
MESSAGE SEND/RECEIVE UNIT
207
TRAFFIC INFORMATION ACQUISITION UNIT
210
COMMUNICATION IF
NETWORK

| PATH IDENTIFIER (401) | TRANSMIT SOURCE EDGE NODE IDENTIFIER (402) | TRANSMIT DESTINATION EDGE NODE IDENTIFIER (403) | VIA LINK IDENTIFIER (404) | PATH CAPACITY (405) | TRAFFIC BANDWIDTH (406) | AGGREGATED PATH IDENTIFIER (407) |
|---|---|---|---|---|---|---|
| 001 | E1 | E4 | a, d, j, l | 500 | 34 | 101 |
| 002 | E1 | E4 | a, d, j, l | 200 | 21 | 101 |
| 003 | E1 | E4 | a, d, j, l | 300 | 25 | 101 |
| 004 | E2 | E4 | b, d, j, l | 250 | 18 | 104 |
| ------------ | ------------ | ------------ | ------------ | ------------ | ------------ | ------------ |

| AGGREGATED PATH IDENTIFIER (501) | TRANSMIT SOURCE EDGE NODE IDENTIFIER (502) | TRANSMIT DESTINATION EDGE NODE IDENTIFIER (503) | VIA LINK IDENTIFIER (504) | PATH CAPACITY (505) | TRAFFIC BANDWIDTH (506) | BYPASS DESTINATION ROUTE INFORMATION (507) |
|---|---|---|---|---|---|---|
| 101 | E1 | E4 | a, d, j, l | 1000 | 134 | a, c, i, l |
| 102 | E1 | E4 | a, d, j, l | 1000 | 121 | a, e, k, l |
| 103 | E1 | E4 | a, d, j, l | 1000 | 125 | a, d, j, l |
| 104 | E2 | E4 | b, d, j, l | 1000 | 118 | b, c, i, l<br>b, e, k, l |
| ⋮ | ⋮ | ⋮ | ⋮ | ⋮ | ⋮ | ⋮ |

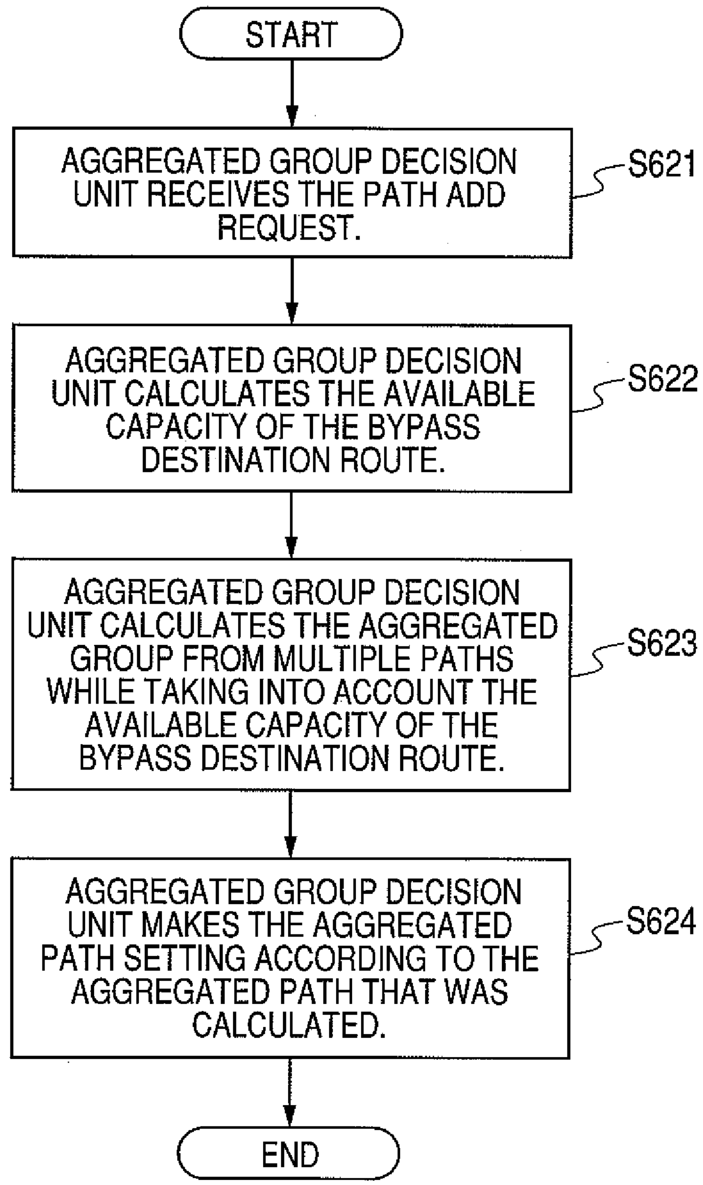
FIG. 10
START
AGGREGATED GROUP DECISION UNIT RECEIVES THE PATH ADD REQUEST.
S621
AGGREGATED GROUP DECISION UNIT CALCULATES THE AVAILABLE CAPACITY OF THE BYPASS DESTINATION ROUTE.
S622
AGGREGATED GROUP DECISION UNIT CALCULATES THE AGGREGATED GROUP FROM MULTIPLE PATHS WHILE TAKING INTO ACCOUNT THE AVAILABLE CAPACITY OF THE BYPASS DESTINATION ROUTE.
S623
AGGREGATED GROUP DECISION UNIT MAKES THE AGGREGATED PATH SETTING ACCORDING TO THE AGGREGATED PATH THAT WAS CALCULATED.
S624
END

| LINK IDENTIFIER (701) | AGGREGATED PATH IDENTIFIER (702) | PATH CAPACITY (TOTAL SUM) (703) | TRAFFIC BANDWIDTH (TOTAL SUM) (704) | AVAILABLE CAPACITY (705) |
|---|---|---|---|---|
| a | 101, 102, 103 | 3000 | 380 | 2620 |
| b | 104, 105, 106 | 3000 | 560 | 2440 |
| c | 107, 108 | 2000 | 1450 | 550 |
| d | 101, 102, 103, 104 109,110, 111 | 3000 | 2800 | 200 |
| ⋮ | ⋮ | ⋮ | ⋮ | ⋮ |

| ROUTE IDENTIFIER (801) | MINIMUM AVAILABLE CAPACITY LINK IDENTIFIER (802) | AVAILABLE CAPACITY (803) |
|---|---|---|
| a, d, j, l | d | 200 |
| a, c, i, l | c | 550 |
| a, e, k, l | k | 150 |
| b, d, j, l | d | 200 |
| ⋮ | ⋮ | ⋮ |

| PATH IDENTIFIER (401) | TRANSMIT SOURCE EDGE NODE IDENTIFIER (402) | TRANSMIT DESTINATION EDGE NODE IDENTIFIER (403) | VIA LINK IDENTIFIER (404) | PATH CAPACITY (405) | TRAFFIC BANDWIDTH (406) | AGGREGATED PATH IDENTIFIER (407) |
|---|---|---|---|---|---|---|
| 001 | E1 | E4 | a, d, j, l | 500 | 34 | 101 |
| 002 | E1 | E4 | a, d, j, l | 200 | 21 | 101 |
| 003 | E1 | E4 | a, d, j, l | 300 | 25 | 101 |
| 004 | E2 | E4 | b, d, j, l | 250 | 18 | 104 |
| ⋮ | ⋮ | ⋮ | ⋮ | ⋮ | ⋮ | ⋮ |
| 010 | E1 | E4 | a, d, j, l | 150 | | 102 |

TRANSPORT CONTROL SERVER, NETWORK SYSTEM AND AGGREGATED PATH SETTING METHOD

CLAIM OF PRIORITY

The present application claims priority from Japanese patent application JP 2008-318325 filed on Dec. 15, 2008, the content of which is hereby incorporated by reference into this application.

FIELD OF THE INVENTION

The present invention relates to a transport control server (TCS), a network system, and an aggregated path setting method, and relates in particular to a transport control server (TCS), a network system, and an aggregated path setting method for setting a path group (aggregated group) in advance according to spare path traffic conditions to switch to a spare path (bypass route) when congestion or a conflict occurs.

BACKGROUND OF THE INVENTION

Methods are known in the conventional art for aggregating multiple paths into one path when controlling or setting paths according to MPLS (Multi-Protocol Label Switching), etc. A network system is disclosed (e.g. JP-A-2002-141932) for limiting to five megabytes the upper bandwidth of one path virtually formed from four logical paths 1-4 as path aggregate connecting points.

In this type of technology, the type of group that the paths are aggregated into may for example be set manually as determined by the network operator or may be regulated based on a predetermined fixed policy such as gathering all identical paths into a single group.

SUMMARY OF THE INVENTION

The technology of the conventional art managed the grouping of aggregated paths based on manual settings or a fixed policy as described above, and there was no scheme for automatically setting the paths into appropriate groups according to information on traffic flowing on the network. If a conflict or congestion for example occurred on a route where paths on the same route were all aggregated into a single group, then that path group could be switched to a separate route to avoid that conflict or congestion. That bypass destination route might become congested however if there was not enough bandwidth on that bypass destination route. Moreover, even assuming that paths on the same route were sorted into multiple groups, congestion might occur on that bypass destination route if there was insufficient bandwidth for each group on that bypass destination route.

In view of the above problems with the conventional art, an object of this invention is to prevent traffic on the bypass path from becoming excessive and congested during the bypassing, by setting the aggregated groups according to traffic information on the bypass paths.

In network systems that cluster the multiple paths together, this invention is unique for example in assuming there are multiple bypass destination routes corresponding to a specified route, calculating the available capacity of the bypass destination routes based on traffic information on each of the multiple bypass destination routes, setting aggregated groups paths with available capacity to the bypass destination route, and bypassing (switching) that path to the aggregated group that was set.

In a transport control server for a first resolution aspect of this invention, a network system for switching each aggregated path to a predetermined bypass destination route when a conflict or congestion occurs, includes a transport control server and multiple nodes, and each node transfers data according to setting information for paths reported from the transport control server and aggregated path concentrating multiple paths between nodes, and the transport control server includes:

a traffic information acquisition unit for acquiring traffic information in the network system, and an aggregated path information storage unit for storing identification information on applicable aggregated path bypass destination routes, into each aggregated path, and a aggregated group decision unit for deciding which of the multiple aggregated paths to concentrate the paths into; and the aggregated group decision unit calculates an expectation value for the applicable aggregated path traffic bandwidth after assigning paths to aggregated paths based on the acquired traffic information, and selects one aggregated path where the aggregated path traffic bandwidth expectation value will not exceed the available capacity of the aggregated path bypass route, and aggregates the applicable paths into the selected aggregated path.

A network system for a second resolution aspect of this invention, for switching each aggregated path to a predetermined bypass destination route when a conflict or congestion occurs, includes:

a transport control server and, multiple nodes for transferring data according to setting information for paths reported from the transport control server and aggregated paths concentrating multiple paths between nodes; and the transport control server includes:

a traffic information acquisition unit for acquiring traffic information in the network system, and an aggregated path information storage unit for storing identification information for the bypass destination route of the applicable aggregated path into each aggregate, and a aggregated group decision unit for deciding which of the multiple aggregated paths to concentrate the paths into; and the aggregated group decision unit calculates an expectation value for the aggregated path traffic bandwidth after assigning paths to aggregated paths based on the acquired traffic information, and calculates the available capacity of the applicable aggregated path bypass destination route based on the acquired traffic information and, selects one aggregated path where the aggregated path traffic bandwidth expectation value will not exceed the available capacity of the aggregated path bypass destination route, and aggregates the applicable paths into the selected aggregated path.

In an aggregated path setting method for a third resolution aspect of this invention, a network system for switching each aggregated path to a predetermined bypass destination route when a conflict or congestion occurs, includes a transport control server and multiple nodes, and each node transfers data according to setting information for paths reported from the transport control server and aggregated paths concentrating multiple paths between applicable nodes; and the aggregated path setting method includes:

acquiring traffic information from the network system, and calculating the expectation value for the aggregated path traffic bandwidth after assigning paths to aggregated paths, based on the acquired traffic information, and calculating the available capacity of the applicable aggregated path bypass route based on the acquired traffic information, and selecting one aggregated path where the aggregated path traffic bandwidth expectation value will not exceed the available capacity of the aggregated path bypass route, and aggregates the applicable paths into the selected aggregated path.

This invention sets aggregated groups according to bypass route traffic information and is therefore capable of preventing congestion from excessive traffic on bypass routes during switching of bypass routes.

BRIEF DESCRIPTION OF THE DRAWINGS

FIG. 5 is a block diagram of the transport control server 100;

FIG. 6 is a table for describing the path information storage unit 208;

FIG. 7 is a table for describing the aggregated path information storage unit 209;

FIG. 10 is a flow chart showing the operation when the transport control server 100 receives the path add request and forms aggregated groups;

FIG. 11 is a table for describing the link information storage unit 212;

FIG. 12 is a table for describing the route information storage unit 213;

FIG. 13 is a table for describing the path storage information unit 208 after adding the additional path.

DETAILED DESCRIPTION OF THE PREFERRED EMBODIMENTS

1. Network System

The network system of this embodiment is described next in detail while referring to the accompanying drawings. In the following description, the same reference number indicates the same item or a corresponding item.

Figure 1:
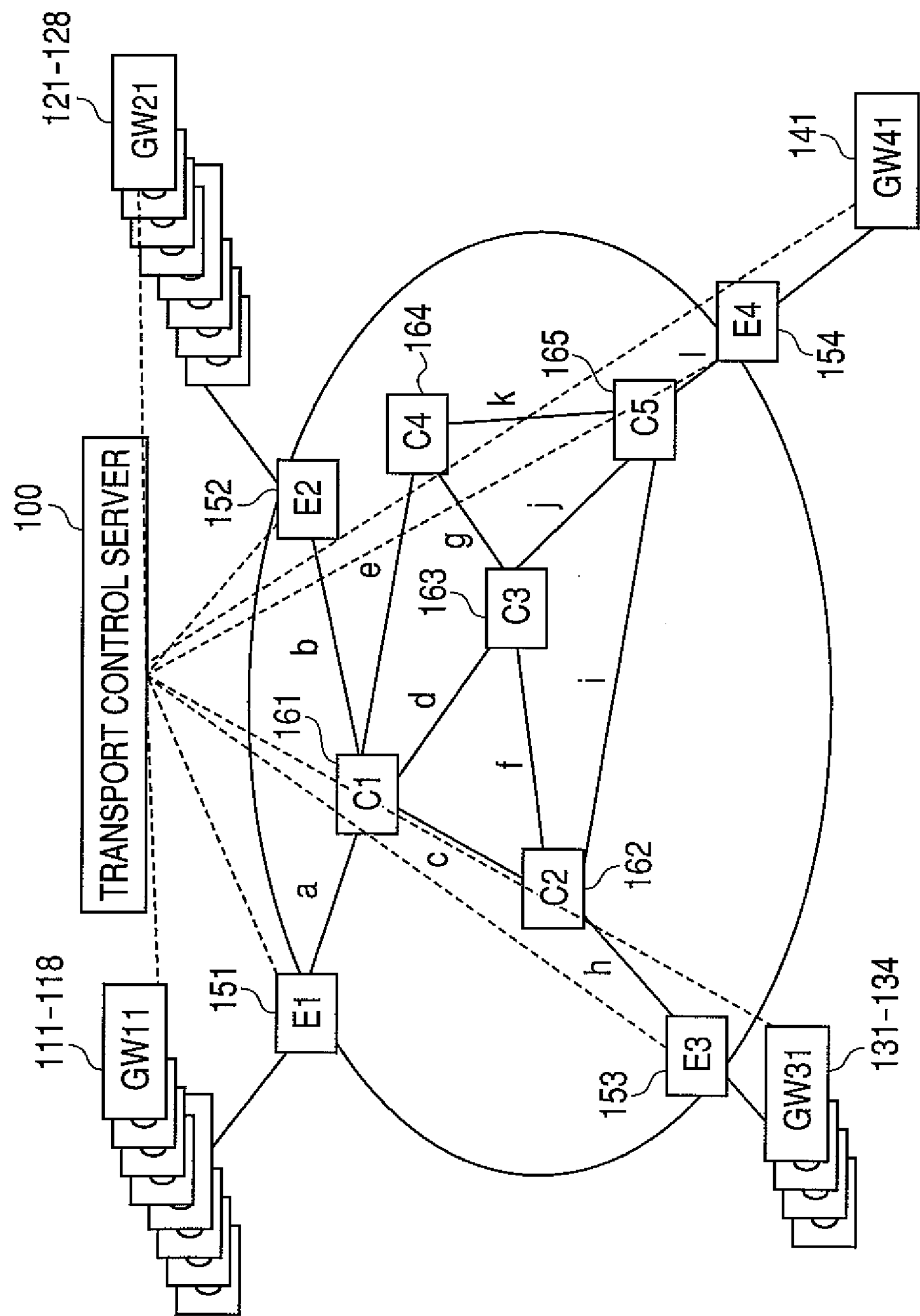
FIG. 1 is a block diagram showing the network system of the present embodiment.

FIG. 1 is a block diagram showing the network system of the present embodiment.

The network system of this embodiment includes for example, a transport control server 100 for managing the network; gateways 111-118, 121-128, 131-134 and 141 by way of terminals connected to the network managed by the transport control server 100 or other networks; and edge nodes 151-154 for storing those gateways in core network; and core nodes 161-165 for forming the core network. Each of the edge nodes 151-154 and the core nodes 161-165 within the network are for example mutually connected by links a-l.

The transport control server 100 is connected to the gateways 111-118, 121-128, 131-134, and 141. The transport control server sets the paths between the gateways 111-118, 121-128, 131-134, and 141. The transport control server 100 is also connected to the edge nodes 151-154. The transport control server sets the aggregated paths between the edge nodes 151-154.

The technology for setting paths and for control may for example utilize MPLS as well as PBB-TE (Provider Backbone Bridge Traffic Engineering) for future path aggregating. Paths are set respectively for services such as audio and video and in the VPN (Virtual Private Network) contained in the gateways 111-118, 121-128, 131-134, and 141 and so are therefore set between the gateways 111-118, 121-128, 131-134, and 141. Increasing the number of gateways also increases the number of paths so that reducing the number of paths processed by the core nodes 161-165 will prove effective in aggregating the paths. In this embodiment, the edge nodes 151-154 form aggregated groups by aggregating the multiple paths connected for example from the gateways 111-118, 121-128, 131-134, and 141, and connecting these aggregated groups as aggregated paths between the edge nodes 151-154. The paths for each aggregated group are from hereon called aggregated paths.

Figure 2:
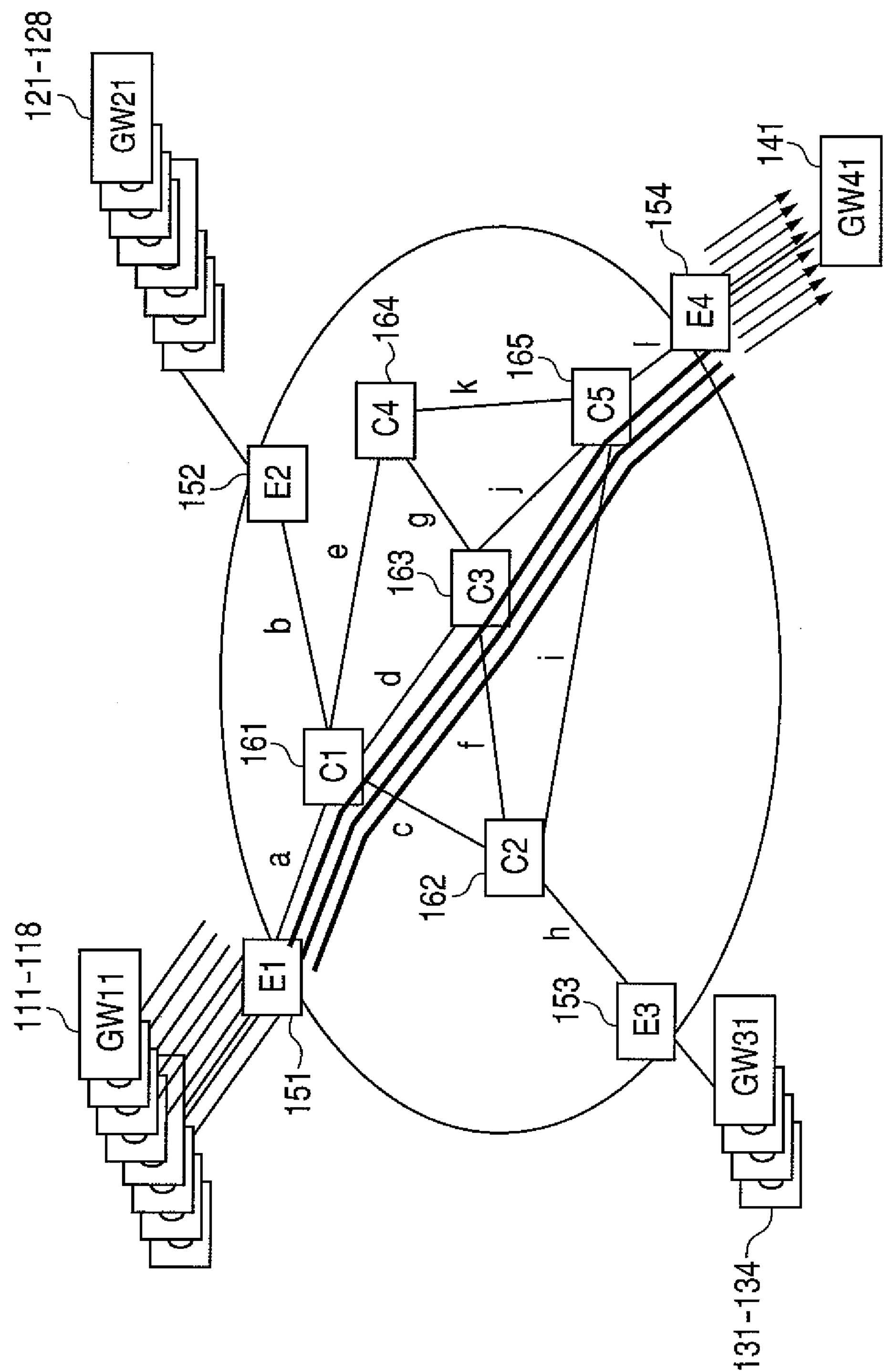
FIG. 2 is a drawing for describing the network system when forming aggregated groups on each route between the respective edge nodes.

FIG. 2 is a drawing for describing the network system when forming aggregated groups on each route between the respective edge nodes.

In the example shown in the drawing the transport control server 100 is omitted for purposes of simplicity but the network system structure is the same as in FIG. 1.

One path from each gateway from each of the gateways 111-118 and gateways 121-128 (total of 16 paths) for example connected to the gateway 141. The transport control server 100 controls the eight paths from the gateways 111-118 to the gateway 141 to aggregated them together in three aggregated paths by way of the routes a, d, j, l, between the edge node 151 through edge node 154. At this time, the transport control server 100 decides what paths will be aggregated in which aggregated paths and sets the aggregated group. The transport control server 100 can also set the bypass destination route for each aggregated path.

Figure 3:
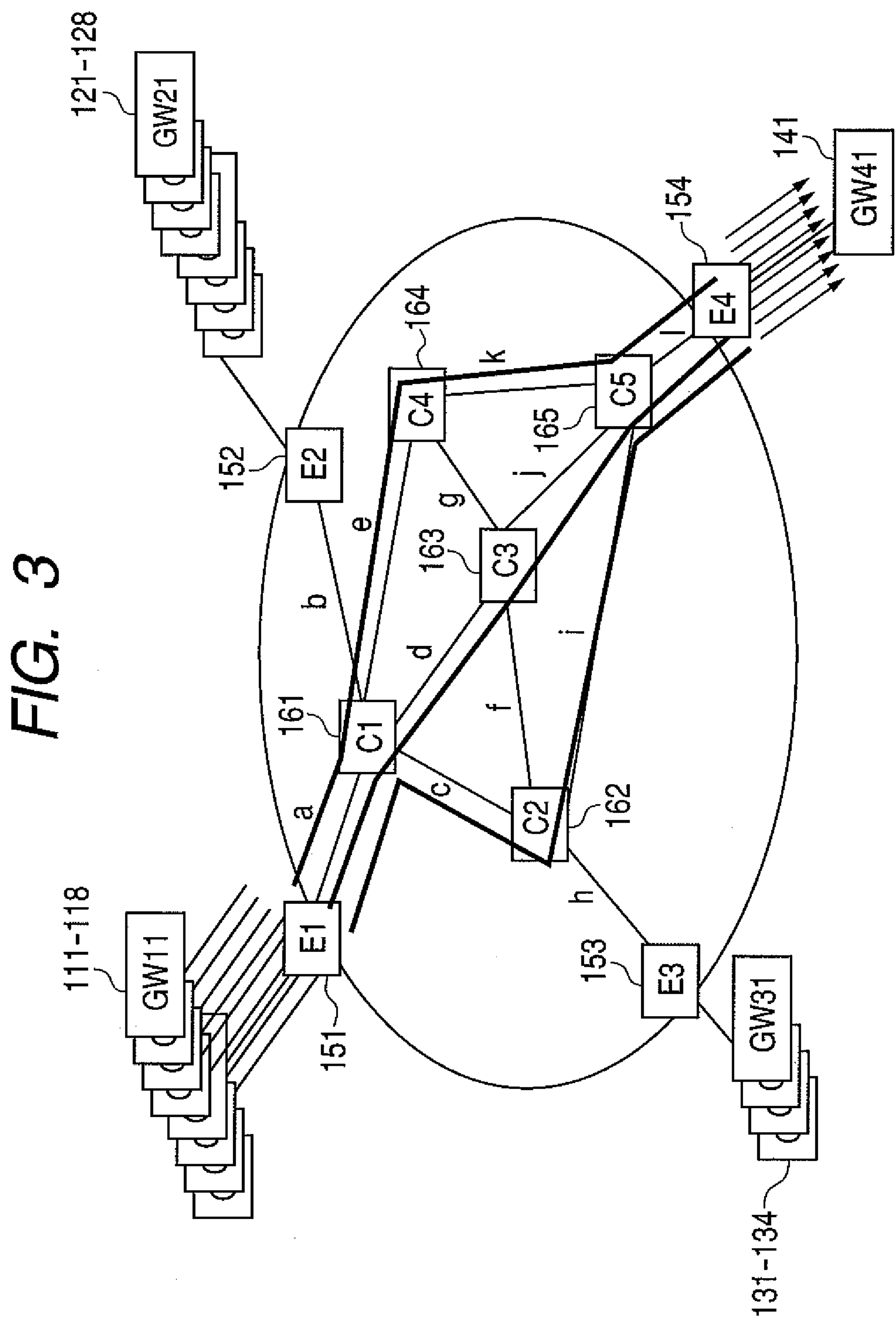
FIG. 3 is a drawing for describing the network system when congestion occurred on the network and the aggregated paths were switched.

FIG. 3 is a drawing for describing the case where the aggregated path was diverted when congestion occurred on the network.

If congestion occurs for example on the link d, then the edge node 151 diverts the aggregated path to the bypass destination route set in advance by the transport control server 100. Among the three aggregated paths in the example in the figure, one path is diverted to routes a, c, i, l, one path is diverted to a, e, k, l, and one path is not diverted and is retained as routes a, d, j, l.

Figure 4:
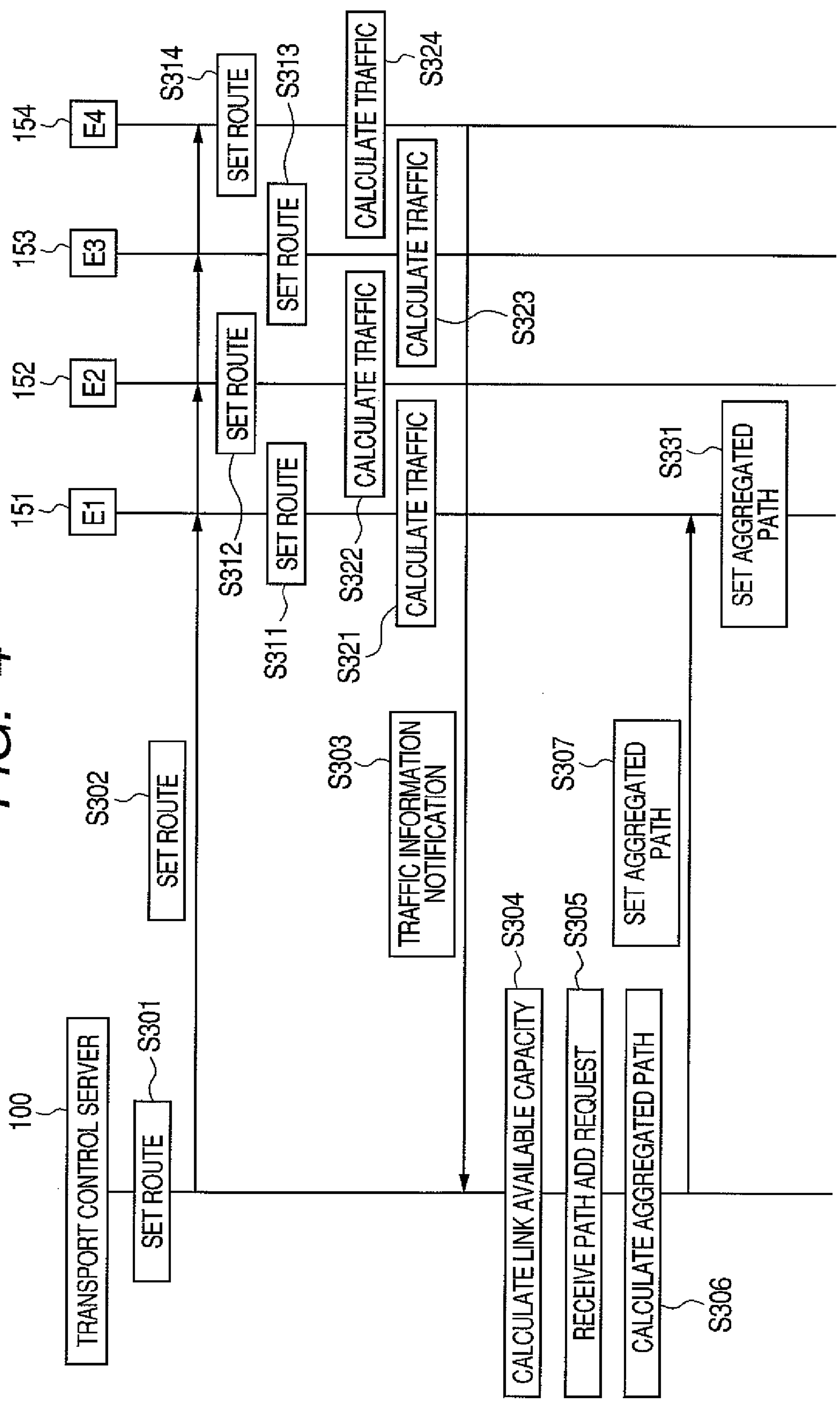
FIG. 4 is a diagram showing the sequence between the transport control server 100 and the edge nodes 151-154.

FIG. 4 is a diagram showing the sequence between the transport control server 100 and the edge nodes 151-154. Only a broad explanation of the operation of the transport control server 100 is given in FIG. 4 and a detailed description is rendered later on.

In step S301, the transport control server 100 sets the routes for the aggregated paths between the edge nodes 151-154. In this route setting, the network operator for example manually sets information relating to each path and aggregated path. In step S302, the transport control server 100 sends the route setting message to the edge nodes 151-154. The route setting message for example includes an aggregated path identifier, an identifier for the transmit source edge node 151-154, an identifier for the transmit destination edge node 151-154, identifiers for links a-l along the path, and bypass destination route information, etc. In steps S311-S314 the edge nodes

151-154 make the route settings for the aggregated paths based on the received route setting message.

In steps S321-S324, the edge nodes 151-154 periodically measure the traffic information such as bandwidths of traffic flowing on each path stored by the gateways 111-118, 121-128, 131-134, and 141. Moreover, the edge nodes 151-154 measure traffic information in the same way even for each aggregated path. In step S303, the edge nodes 151-154 notify the transport control server 100 of each piece of traffic information respectively measured in steps S321-S324 (traffic information notification). The traffic information notification that the edge nodes 151-154 notify to the transport control server 100 includes for example traffic information, and path identifiers (aggregated path identifiers in the case of traffic information for aggregated paths). Traffic information example may utilize NetFlow (IETF RFC3954) or IPFIX (IP Flow Information eXport (IETF RFC5102)) etc.

In step S304, the transport control server 100 calculated the available capacity of each link a-l. In step S305, the transport control server 100 receives a path add request. The path add request includes for example path identifiers for paths to be newly added, identifiers for transmit source edge nodes, identifiers for the transmit destination edge nodes, identifiers for the link being transited as well as the path capacity, etc. Examples of path add requests received by the transport control server 100 are for example: when information such as path identifiers for paths to be newly added (additional paths) are entered by manual settings by the network operator; when the gateways 111-118 or 121-128 or 131-134 or 141 for connecting the additional path notify the transport control server 100 of a path add request; or when the gateways 111-118 or 121-128 or 131-134 or 141 sends a control signal for connecting the additional path, to the opposite corresponding gateways 111-118 or 121-128 or 131-134 or 141 and the edge nodes 151-154 that intercepted that control signal notifies the transport control server 100 of the path add request.

In step S306, the transport control server 100 makes the aggregated group calculation (aggregated path calculation) and decides in which aggregated path to concentrate the additional paths. In step S307 the transport control server 100 sends an aggregated path setting message for example to the transmit source edge node 151 for aggregating the additional path into the aggregated group calculated in step S306 for the additional path. This aggregated path setting message includes for example path identifiers, and aggregated path identifiers for aggregated paths where the paths are aggregated. In step S331, the edge node 151 sets the aggregated path according to the aggregated path setting message received from the transport control server 100.

2. Transport Control Server

FIG. 5 is a block diagram of the transport control server 100.

The transport control server 100 includes for example a control processor unit 200, a data storage unit 211, and a communication IF 210. The control processor unit 200 includes for example a path setter unit 201, an aggregated path setter unit 202, an aggregated group decision unit 203, a path traffic calculator unit 204, and an aggregated path traffic calculator unit 205, a message send/receive unit 206, and a traffic information acquisition unit 207. The data storage unit 211 includes for example a path information storage unit 208, an aggregated path information storage unit 209, a link information storage unit 212, and a route path information storage unit 213. The control processor unit 200 connects to the network by way of the communication IF 210. The transport control server 100 may also include an input unit for purposes of convenience.

The path setter unit 201 sets the paths connecting between the gateways 111-118, 121-128, 131-134, and 141. The aggregated path setter unit 202 sets the aggregated paths connecting between the edge nodes 151-154. The aggregated group decision unit 203 forms aggregated groups containing multiple paths according to the traffic information. The path traffic calculator unit 204 calculates the traffic information (bandwidth) for the paths connected between the gateways 111-118, 121-128, 131-134, and 141. The aggregated path traffic calculator unit 205 calculates the traffic information (bandwidth) for aggregated paths connected between the edge nodes 151-154. The message send/receive unit 206 sends and receives messages for example between the edge nodes 151-154, etc. The traffic information acquisition unit 207 receives for example traffic information notification sent from the edge nodes 151-154. The communication IF 210 is an interface for communication between for example the edge nodes 151-154, etc.

FIG. 6 is a table for describing the path information storage unit 208.

The path information storage unit 208 stores the transmit source edge node identifier 402, transmit destination edge node identifier 403, the via link identifier 404, the path capacity 405, traffic bandwidth 406 and aggregated path identifier 407 corresponding to the path identifier 401 for each path. Sequential numbers or letters for identifying paths, may be utilized as appropriate for the path identifier 401. The transmit source edge node identifier 402 and the transmit destination edge node identifier 403 for example store for example appropriate node identifiers pre-assigned in the edge nodes 151-154. Appropriate symbols or letters such as E1, E2 for specifying nodes can be utilized as node identifiers. The via link identifier 404 stores one or multiple link identifiers used by the paths. Appropriate symbols or letters for specifying the link such as a, b may be used as the link identifiers. The path capacity 405 stores the band assigned to the path as for example numerals, etc. The traffic bandwidth 406 stores the bandwidth of traffic flowing along the paths as numerals, etc. The traffic bandwidth 406 stores for example the average bandwidth, the maximum bandwidth, and the minimum bandwidth for a predetermined fixed time based on traffic information that was measured. The aggregated path identifier 407 can store identifiers for aggregated paths where the paths are aggregated. Appropriate identification information such as sequential numbers or letters can be utilized as the aggregated path identifiers. The path identifier 401, the transmit source edge node identifier 402, the transmit destination edge node identifier 403, the via link identifier 404, the path capacity 405 and the aggregated path identifier 407 can be set in advance within the path information storage unit 208.

FIG. 7 is a table for describing the aggregated path information storage unit 209.

The aggregated path information storage unit 209 can store for example the transmit source edge node identifier 502, the transmit destination edge node identifier 503, the via link identifier 504, the path capacity 505, the traffic bandwidth 506 and the bypass destination route 507 corresponding to the aggregated path identifier 501. The aggregated path identifier 501 can for example utilize appropriate identification information such as sequential numbers or letters the same the above described aggregated path identifier 407. The transmit source edge node identifier 502 and the transmit destination edge node identifier 503 store for example the node identifiers. The via link identifier 504 stores one or multiple link identifiers used by the aggregated paths. The path capacity 505 stores for example the bandwidth assigned to the aggregated path as for example, numerals. The traffic bandwidth

506 stores the bandwidth of traffic flowing on the aggregated paths as for example numbers. The traffic bandwidth 506 stores for example the average bandwidth, the maximum bandwidth, the minimum bandwidth for a predetermined fixed time based on traffic information that was measured. The bypass destination route 507 stores identification information for the bypass destination route of the aggregated paths. The bypass destination route information 507 can for example utilize combinations of link identifiers for links along the bypass (destination) route. The aggregated path identifier 501, the transmit source edge node identifier 502, the transmit destination edge node identifier 503, the via link identifier 504, the path capacity 505 and the bypass destination route information 507 can be set in advance within the aggregated path information storage unit 209.

FIG. 11 is a table for describing the link information storage unit 212.

The link information storage unit 212 stores the aggregated path identifier 702, the path capacity (total sum) 703, the traffic bandwidth (total sum) 704 and the available capacity 705 corresponding to the link identifier 701. The link identifier 701 includes the same link identifiers as the via link identifier 404 for path information storage unit 208 or the via link identifier 504 for the aggregated path information storage unit 209. The link identifier 701 can for example utilize appropriate identification information such as sequential numbers or letters for identifying the link. The aggregated path identifier 702 stores the aggregated path identifiers passing through the links. The path capacity (total sum) 703 stores the total sum of the path capacity (bandwidth) assigned to each aggregated path passing through the link for example as a number, etc. The traffic bandwidth (sum) 704 stores the total sum of the bandwidth of traffic flowing on the link for example as a number, etc. The traffic bandwidth 704 is in other words the total sum of the traffic bandwidth of aggregated path traffic passing along the links shown by the corresponding link identifier 701. The available capacity 705 stores the available capacity of the link for example as numbers, etc. The available capacity of the link can be found by subtracting the traffic bandwidth (total sum) 704 from the path capacity (total sum) 703. Appropriate initial information regarding the link identifier 701 and the available capacity (total sum) 703 can be set in advance in the link information storage unit 212.

FIG. 12 is a table for describing the route information storage unit 213.

The route information storage unit 213 stores for example the minimum available capacity link identifier 802 and the available capacity 803 corresponding to the route identifier 801. The route identifier 801 is the same as the via link identifier 404 for path information storage unit 208 or the via link identifier 504 for the aggregated path information storage unit 209. The route identifier 801 for example can combine link identifiers for the via links. Identification information such as sequential numbers or letters can utilized as appropriate for identifying the route. The minimum available capacity link identifier 802 stores link identifiers for links with having minimal available capacity among the via links on the route. The available capacity 803 stores the available capacity of links shown by the minimum available capacity link identifier 802 for example as numbers, etc. Appropriate initial information regarding the minimum available capacity link identifier 802 can be set in advance in the route information storage unit 213.

Figure 8:
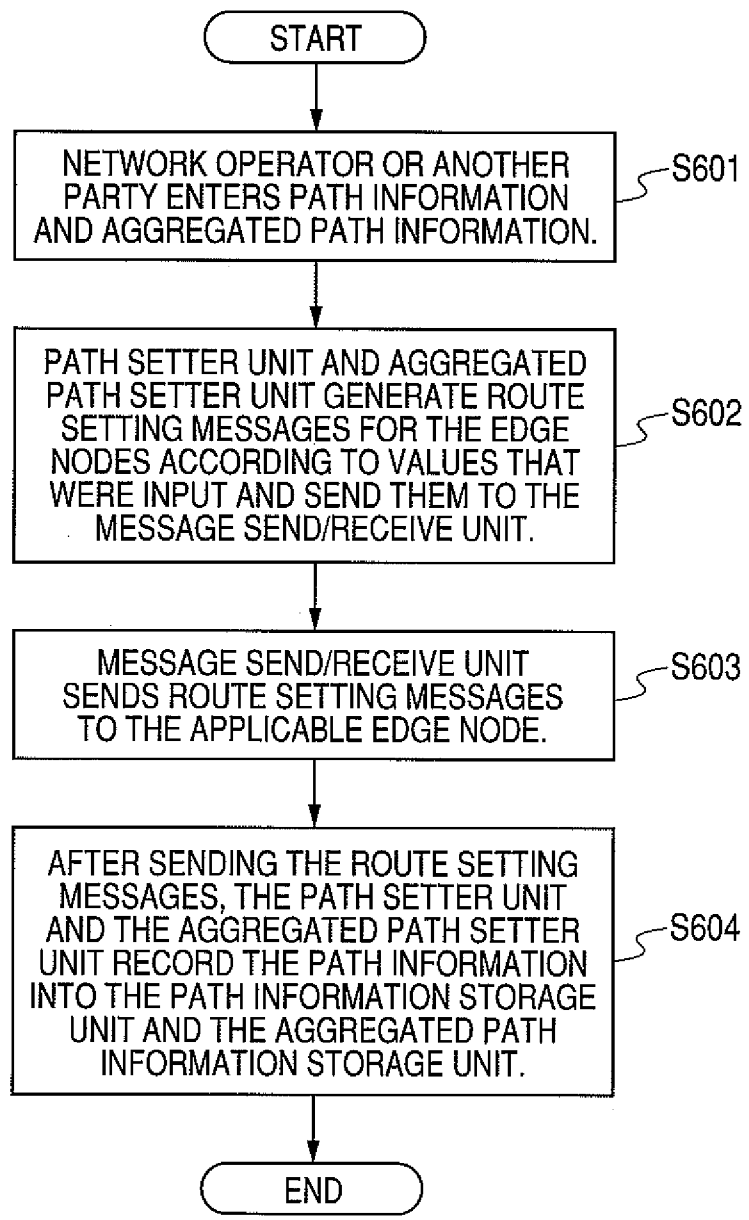
FIG. 8 is a flow chart showing the operation when the transport control server 100 is setting the routes.

FIG. 8 is a flow chart showing the route setting by the transport control server 100.

In step S601, the network operator makes entries on an appropriate input unit and the transport control server 100 then inputs the path information and the aggregated path information from the input unit. This path information that was input includes: path identifiers for identifying paths between the gateways 111-118, 121-128, 131-134, and 141; transmit source edge node identifiers and transmit destination edge node identifiers for specifying the edge nodes 151-154 along the path; via link identifiers from the transmit source edge node to the transmit destination edge node; and aggregated path identifiers for the path capacity of the path and the aggregate destination. Moreover, the aggregated path information includes for example: aggregated path identifiers for identifying aggregated paths between the edge nodes 151-154; transmit source edge node identifiers and transmit destination edge node identifiers where the aggregated path was set; via link identifiers located from the transmit source edge node to the transmit destination edge node; and aggregated path capacity and bypass (destination) route information.

In step S602, the path setter unit 201 and the aggregated path setter unit 202 make route setting messages for each of the edge nodes 151-154 according to the input value (path information, aggregated path information) that was input in step 601, and send the route setting messages to the message send/receive unit 206. In step S603, the message send/receive unit 206 sends the route setting messages to the applicable edge nodes 151-154. The message send/receive unit 206 for example sends the route setting messages to the edge nodes 151-154 shown by the transmit source edge node contained in the aggregated path information.

In step S604, the path setter unit 201 and the aggregated path setter unit 202 respectively record the path information and aggregated path information that was input, to the path information storage unit 208 and the aggregated path information storage unit 209. More specifically, in the case of path information the path setter unit 201 records the path identifier 401, the transmit source edge node identifier 402, the transmit destination edge node identifier 403, the via link identifier 404, the path capacity 405, and the aggregated path identifier 407 that were input, into the path information storage unit 208. In the same way, in the case of aggregated path information, the aggregated path setter unit 202 records the aggregated path identifier 501, the transmit source edge node identifier 502, the transmit destination edge node identifier 503, the via link identifier 504, the path capacity 505 and the bypass (destination) route information 507 into the aggregated path information storage unit 209. The processing in step S604 may be implemented at a convenient timing after the processing in step S601.

Figure 9:
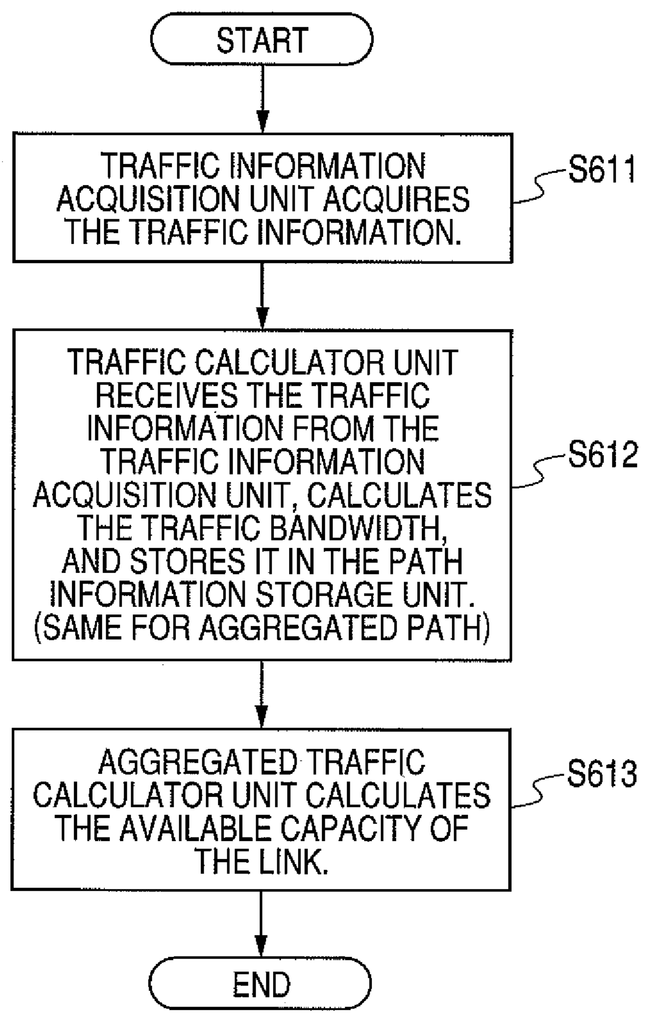
FIG. 9 is a flow chart showing the operation when the transport control server 100 is calculating the traffic bandwidth.

FIG. 9 is a flow chart showing the operation when the transport control server 100 is calculating the traffic bandwidth.

In step S611, the traffic information acquisition unit 207 receives traffic information notification sent from each of the edge nodes 151-154 by way of the communication IF 210, and acquires the path traffic information or aggregated path traffic information contained in that notification. In the case of path traffic information, the traffic information acquisition unit 207 transfers the traffic information and the path identifiers that were received, to the path traffic calculator unit 204. In the case of aggregated path traffic information on the other hand, the traffic information acquisition unit 207 transfers the traffic information and the aggregated path identifiers that were received, to the aggregated path traffic calculator unit 205. The traffic information acquisition unit 207 can determine the transfer destination by referring to the type information that indicates the path or the aggregated path included in the traffic information notification.

In the case of path traffic information, the path traffic calculator unit 204 in step S612 calculates the traffic bandwidth on the path based on traffic information received from the traffic information acquisition unit 207 and, stores the traffic bandwidth of the calculated path corresponding to path identifier 401 in the path information storage unit 208. In the case of aggregated path traffic information on the other hand, the aggregated path traffic calculator unit 205 in step S612 calculates the traffic bandwidth on the aggregated path based on traffic information received from the traffic information acquisition unit 207, and records the traffic bandwidth of the calculated aggregated path corresponding to the aggregated path identifier 501 into the aggregated path information storage unit 209. The method for calculating the path and the aggregated path traffic bandwidth may for example consist of a method for calculating the maximum bandwidth or the minimum bandwidth or average bandwidth for traffic information over a fixed period of time.

In step S613, the aggregated path traffic calculator unit 205 calculates the available capacity of each of the links a-l, and records the available capacity calculated for each of the links a-l, in the link information storage unit 212. In the method for calculating the available capacity of each of the links a-l, the aggregated path traffic calculator unit 205 checks the traffic bandwidth 506 of the aggregated path information storage unit 209 shown in FIG. 7 and finds the total sum of the traffic bandwidths 506 for each link on each aggregated path along those links. The aggregated path traffic calculator unit 205 then stores values found for the link identifier 701, into the traffic bandwidth (total sum) 704 of the link information storage unit 212 in FIG. 11. The aggregated path traffic calculator unit 205 then calculates the available capacity from the traffic bandwidth (total sum) 704 and the path capacity (total sum) 703.

More specifically, the aggregated path traffic calculator unit 205 selects one link identifier 701 (e.g. "a") from the link information storage unit 212. The aggregated path traffic calculator unit 205 searches the via link identifier 504 of the aggregated path information storage unit 209, retrieves a via link identifier 504 (e.g. "a, d, j, l") containing the selected link identifier 701, and acquires the corresponding aggregated path identifier 501 (e.g. 101, 102, 103). The aggregated path traffic calculator unit 205 then stores the acquired aggregated path identifier into the corresponding link identifier 701 that was selected into the link information storage unit 212. The aggregated path traffic calculator unit 205 also searches the aggregated path information storage unit 209, and calculates the total sum of each traffic bandwidth 506 (e.g. 134, 121, 125) corresponding to the acquired aggregated path identifier 501. The aggregated path traffic calculator unit 205 then stores the total sum of the calculated traffic bandwidth 506 corresponding to the selected link identifier 701, into the link information storage unit 212. The aggregated path traffic calculator unit 205 further finds a value where the traffic bandwidth (total sum) 704 is subtracted from the path capacity (total sum) 703 as the available capacity 705 for the selected link identifier 701 and stores that value in the link information storage unit 212. The aggregated path traffic calculator unit 205 then repeats the above described process for all link identifiers 701, and finds the available capacity of each link identifier.

FIG. 10 is a flow chart showing the operation when the transport control server 100 receives the path add request and forms aggregated groups.

In step S621, the aggregated group decision unit 203 receives the path add request by way of the communication IF 210 and the message send/receive unit 206. The path add request that was received includes for example a path identifier for the path to be newly added (e.g. 010), a transmit source edge node identifier (e.g. E1), a transmit destination edge node identifier (e.g. E4), a via link identifier (e.g. a, d, j, l) and path capacity (e.g. 150). The aggregated group decision unit 203 as shown in FIG. 13, stores each of the received information into the path information storage unit 208.

In step S622, the aggregated group decision unit 203 calculates the available capacity of the bypass destination route. In order to calculate the bypass destination route, the aggregated group decision unit 203 for example searches for via link identifiers 504 in the aggregated path information storage unit 209 based on the via link identifiers (e.g. a, d, j, l) requested in the path add request, and acquires one or multiple corresponding aggregated path identification 501 and bypass destination route information 507. The aggregated group decision unit 203 also implements the following processing for the respective acquired bypass destination route information 507, and finds the available capacity on the bypass destination route for each acquired candidate aggregated paths to assign each path.

The aggregated group decision unit 203 searches the route information storage unit 213, and selects an entry matching the acquired bypass destination route information 507 and the route identifier 801. The aggregated group decision unit 203 searches the link information storage unit 212 based on each link identifier contained in the matching route identifier 801, and searches the respective corresponding available capacity 705. The aggregated group decision unit 203 finds the minimum available capacity 705 among the available capacity 705 that were searched, and the corresponding link identifier 701. The aggregated group decision unit 203 stores the link identifier that was found in the box for available capacity minimum link identifier 802 of route information storage unit 213 corresponding to route identifier 801. The aggregated group decision unit 203 sets the minimum available capacity 705 that was found as the available capacity of the bypass destination route, corresponding to the route identifier 801 and stores it in the route information storage unit 213. Calculation of the available capacity of the bypass destination route need not be limited to after receiving the path add request, and may for example also be calculated after the processing the above described step S613.

If a route identifier 801 equivalent to the via link identifier requested by the path add request was not stored in the route information storage unit 213, then the aggregated group decision unit 203 can newly add the via link identifier requested by the path add request to the route information storage unit 213.

In step S623 the aggregated group decision unit 203 calculates the aggregated group from multiple paths while taking into account the available capacity of the bypass destination route. When assigning a path to any of the aggregated paths, the aggregated group decision unit 203 for example, assigns the paths to the aggregated paths so that the traffic bandwidth of the aggregated path after path assignment does not exceed the available capacity of the bypass destination route for the aggregated path that is the assignment destination.

More specifically, the aggregated group decision unit 203 adds the traffic bandwidth 506 corresponding to the aggregated path identifier 501 acquired in step S622, to the path capacity contained in the add path request, and finds the expectation value for the traffic bandwidth after the additional path was assigned to that aggregated path. If there is already a path as described later on, then the traffic bandwidth of the path may be added to the traffic bandwidth of the aggregated path to find the traffic bandwidth expectation value.

The aggregated group decision unit 203 searches the route identifiers 801 of route information storage unit 213 based on the bypass destination route information 507 that was acquired for the aggregated paths, and selects one route identifier 801 that is larger than the expectation value of the traffic bandwidth where the corresponding available capacity 803 was found. The aggregated group decision unit 203 can for example select the largest route identifier 801, or a route identifier 801 (e.g. a, e, k, i) that is larger than and also nearest the expectation value of the traffic bandwidth found by the route identifier 801 or the available capacity 803. The aggregated group decision unit 203 searches the bypass destination route information 507 in the aggregated path information storage unit 209 based on the selected identifier 801, and acquires the corresponding aggregated path identifier 501 (e.g. 102). The aggregated group decision unit 203 stores the acquired aggregated path identifier 501 in the path information storage unit 208 corresponding to the additional path identifier 401 (e.g. 010).

If there is not even one bypass destination route with available capacity 803 that is the same or larger than the path capacity contained in the path add request, then the aggregated group decision unit 203 may select a bypass destination route information 507 identical to the via link identifier that was requested in the path add request, and concentrate the additional path in the aggregated path group for the corresponding aggregated path identifier 501. The aggregated group decision unit 203 may also search the route information storage unit 213, and if the path capacity contained in the path add request is larger than the available capacity 803 of the via links, then the aggregated group decision unit 203 may terminate the processing along with an error notification such as showing an error display, without concentrating the additional path.

Besides the available capacity on the bypass destination route, the communication delay on the bypass destination route is another attribute that is sometimes considered. In this case, when assigning paths to each aggregated path, if the delay on the aggregated path that is the assignment destination exceeds the allowable tolerance for aggregated path destination bypass due to adding new paths, then the aggregated group decision unit 203 assigns another aggregate bypass instead of that (large delay) aggregated path. The aggregated group decision unit 203 judges how the delay on the aggregated path fluctuates by way of the relation between the aggregated path traffic and the aggregated path assignment bandwidth.

In step 624, aggregated group decision unit 203 sets the aggregated path according to the aggregated group that was calculated. The aggregated path setting can perform the same processing as insteps S602 and S603 in the above described FIG. 8. The aggregated group decision unit 203 for example, transmit route settings or route add messages including the path identifier 401, the transmit source edge node identifier 402, transmit destination edge node identifier 403, the via link identifier 404, the path capacity 405 and aggregated path identifier 401 stored in path information storage unit 208 corresponding to the added path: into the path setter unit 201. The path setter unit 201 performs the processing in the above described in step S602 and S603 when this message is received, based on data contained in the received message.

3. Methods for Calculating Other Aggregated Groups

In the above embodiment, when a path add request was received, the aggregated group was calculated after judging which aggregated path to place the newly added path into. Another method that may be used is to calculate the aggregated group after judging which aggregated group to concentrate all paths including newly added paths (additional paths) and existing paths. Moreover, besides adding new paths, the aggregated group may be recalculated after re-judging which aggregated group to concentrate already existing paths into.

(1) Method for Calculating Aggregated Groups for Existing Paths and Additional Paths When aggregating existing paths and new additional paths, the aggregated group can be calculated by for example sequentially selecting paths from among the path information stored in the path information storage unit 208, and path information contained in the path add request and then processing the selected path in the same way as the above described newly added paths. Here, the aggregated path identifier 702, the traffic bandwidth (total sum) 704 and the available capacity 705 may be initialized (reset) in the line information storage unit 212, and the minimum available capacity link identifier 802 and available capacity 803 may be initialized in the route information storage unit 213, and when assigning existing paths and additional paths to the aggregated path, the available capacity 803 and so on, may be found based on the traffic bandwidth 406 of the assigned path. Further, the aggregated path identifier 407 of path information storage unit 208 and the traffic bandwidth 506 of aggregated path storage unit 209 may be initialized in advance.

The following are examples of methods for selecting paths when assigning paths to aggregated paths. The path moreover can be selected as appropriate without being limited to the following examples.

One method for example selects paths at random and assigns them to an aggregated path. The aggregated group decision unit 203 selects the path identifier 401 at random from the path information storage unit 208 by using random numbers. A second method selects paths according to a path order of priority that was set beforehand for each path, and then assigns the selected path to each aggregated path. This path order of priority may be input from a suitable input unit operated in advance for example by a network operator, and then linked to the path identifier 401 and set in the path information storage unit 208, etc. The aggregated group decision unit 203 refers to the order of priority and selects the corresponding path identifier 401 in the priority sequence.

A third method selects the path in the order of large path capacity and assigns them to the aggregated path. The aggregated group decision unit 203 for example searches the path capacity 405 of path information storage unit 208 and selects the path identifier 401 according to the order of large value. When using this method to calculate the aggregated group, the capacity of each path aggregated in the specified aggregated group is large, which serves to limit the number of paths aggregated in that aggregated path to a small number. Consequently fewer paths are affected by changes in delay due to bypassing. Aggregated groups can therefore be formed that are ideal for the setting bypass paths when conflicts or congestion occurs.

A portion or all combinations of paths for assigning to aggregated paths can be calculated, and the combination of path capacity or traffic bandwidth of the aggregated path closest to the available capacity of the bypass destination route then utilized.

(2) Method for Calculating Aggregated Groups for Existing Paths

The processing for recalculating the aggregated group for existing paths was executed in the above described examples when a path add request was received. However, that processing may also be executed when for example the path traffic calculator unit 204 or the aggregated path traffic calculator unit 205 detects a change in the traffic status, and the aggregated group then recalculated.

More specifically, the path traffic calculator unit 204 or the aggregated path traffic calculator unit 205 detects the fluctuation in traffic status and notifies the aggregated group decision unit 203 with a aggregated group change request when the traffic on a specified path deviates from within the range (or are outside the range) of specified pre-defined specified values; or the variation (coefficient of fluctuation) of the traffic on a specified path deviates from within the range (or are outside the range) of specified pre-defined specified values, etc. After receiving a aggregated group change request, the aggregated decision group 203 executes the same processing as described above when calculating the aggregated group for existing paths and additional paths, and calculates the aggregated group for the existing path.

Methods for setting the above described defined values may include for example, the network operator entering the defined values from a suitable input unit; or the path traffic calculator 204 automatically calculating the defined values from information such as past traffic bandwidths calculated by the path traffic calculator 204. As one example, the path traffic calculator 204 may find the specified values by calculating the average values, and maximum values for past traffic bandwidths and adding pre-set tolerance values to these calculated values.

What is claimed is:

1. A transport control server for a network system including the transport control server, multiple nodes, and a network connecting the transport control server and the multiple nodes, where the transport control server is configured to provide setting information to set: paths for each node to transfer data, aggregated paths concentrating multiple paths between nodes, and predetermined bypass destination routes to switch each aggregated path to when congestion occurs, and the transport control server comprising:

a traffic information acquisition unit for acquiring traffic information for the network system;

an aggregated path information storage unit for storing identification information on applicable aggregated path bypass destination routes, for each aggregated path of the aggregated paths;

an aggregated group decision unit for deciding into which of multiple aggregated paths, to concentrate non-aggregated paths;

wherein the aggregated group decision unit:

assigns the non-aggregated paths to candidate aggregated paths;

calculates an expectation value for an applicable aggregated path traffic bandwidth for each of the candidate aggregated paths, based on the acquired traffic information;

calculates an available capacity of the applicable aggregated path bypass destination routes, based on the expectation value;

selects one aggregated path where the expectation value will not exceed the available capacity of the aggregated path bypass destination route; and aggregates the non-aggregated paths into the selected aggregated path.

2. The transport control server according to claim 1 further comprising an aggregated path traffic calculator unit to calculate traffic bandwidth of the aggregated paths based on the acquired traffic information, and the aggregated group decision unit finds the expectation value for the applicable aggregated path traffic bandwidth after assigning the path to a candidate aggregated path, based on path capacity or the traffic bandwidth of assigned paths, and the traffic bandwidth of the aggregated paths.

3. The transport control server according to claim 2, wherein the aggregated group decision unit searches calculated available capacities of bypass destination routes when a request to add a new path was received, decides which aggregated path to concentrate the new path into, and aggregates the applicable path into the aggregated path.

4. The transport control server according to claim 2, further comprising:

a path traffic calculator unit for calculating the traffic bandwidth of the path from acquired traffic information, wherein the aggregated group decision unit finds the expectation value for the aggregated path traffic bandwidth for existing paths, based on the calculated path traffic bandwidth and aggregated path traffic bandwidth; and finds the expectation value for the aggregated path traffic bandwidth for new paths to add, based on the traffic bandwidth for aggregated paths and path capacity of pre-established paths.

5. The transport control server according to claim 1, wherein one or multiple links connect between the multiple nodes, and the aggregated group decision unit finds the available capacity of each link based on acquired traffic information, and sets a smallest available capacity as the available capacity of the bypass destination route while referring to the available capacities of links along the bypass destination route.

6. The transport control server according to claim 5, further comprising:

a link information storage unit to store the available capacity of a link linked to a link identifier, and a route information storage unit to store the available capacity of the bypass destination route linked to the link identifier for the links along the aggregated path bypass destination route, and the aggregated group decision unit stores the available capacity found for each link in the link information storage unit, searches the link information storage unit and finds the available capacity of the bypass destination route, and stores the available capacity that was found for the bypass destination route in the route information storage unit.

7. The transport control server according to claim 1, wherein the aggregated group decision unit resets a relation between existing paths and the aggregated paths when a request to add a new path was received, decides which aggregated path to concentrate the applicable existing path and the new path into, and aggregates the applicable existing and new paths into the aggregated path.

8. The transport control server according to claim 1, wherein the aggregated group decision unit resets a relation between existing paths and the aggregated paths when an aggregated change request for a path is received, decides which aggregated path to concentrate the applicable existing path into, and aggregates the applicable existing path into the aggregated path.

9. The transport control server according to claim 8, wherein the aggregated change request for the path is sent when traffic fluctuation on the path or aggregated path exceeds a pre-established range.

10. The transport control server according to claim 1, wherein the aggregated group decision unit assigns paths at random to the aggregated paths when deciding in which aggregated path to concentrate the applicable non-aggregated paths.

11. The transport control server according to claim 1, wherein the aggregated group decision unit assigns paths to each aggregated path according to a preset path order of priority when deciding in which aggregated path to concentrate the applicable non-aggregated paths.

12. The transport control server according to claim 1, wherein the aggregated group decision unit assigns paths in an order of large available path capacity to the aggregated path when deciding in what aggregated path to concentrate the applicable non-aggregated paths.

13. The transport control server according to claim 1, wherein the aggregated group decision unit calculates a combination of a portion or all paths to assign to aggregated paths, and utilizes the combination whose aggregated path traffic bandwidth expectation value is closest to the available capacity of the bypass destination route.

14. The transport control server according to claim 1, further comprising:

a path information storage unit to link a path identifier that identifies the path, and to store aggregated path identifiers to identify aggregated paths where the paths are aggregated; and the aggregated group decision unit links the aggregated path identifier the selected aggregated path identifier, and stores the selected aggregated path identifier into the path information storage unit.

15. The transport control server according to claim 1, wherein the aggregated path information storage unit stores one or multiple link identifiers showing the route used by the applicable aggregated path, the traffic bandwidth of the applicable aggregated path, and identification information for the aggregated path bypass destination route; linked to an aggregated path identifier for identifying the aggregated path.

16. A network system comprising a transport control server, multiple nodes, and a network connecting the transport control server and the multiple nodes, where the transport control server is configured to provide setting information to set: paths for each node to transfer data, aggregated paths concentrating multiple paths between nodes, and predetermined bypass destination routes to switch each aggregated path to when congestion occurs, and the transport control server including:

a traffic information acquisition unit for acquiring traffic information for the network system;

an aggregated path information storage unit for storing identification information on applicable aggregated path bypass destination routes, for each aggregated path of the aggregated paths;

an aggregated group decision unit for deciding into which of multiple aggregated paths, to concentrate non-aggregated paths;

wherein the aggregated group decision unit:

assigns the non-aggregated paths to candidate aggregated paths;

calculates an expectation value for an applicable aggregated path traffic bandwidth for each of the candidate aggregated paths, based on the acquired traffic information;

calculates an available capacity of the applicable aggregated path bypass destination routes, based on the expectation value;

selects one aggregated path where the expectation value will not exceed the available capacity of the aggregated path bypass destination route; and aggregates the non-aggregated paths into the selected aggregated path.

17. An aggregated path setting method for a network system including a transport control server, multiple nodes, and a network connecting the transport control server and the multiple nodes, where the transport control server is configured to provide setting information to set: paths for each node to transfer data, aggregated paths concentrating multiple paths between nodes, and predetermined bypass destination routes to switch each aggregated path to when congestion occurs, and the method comprising:

acquiring traffic information for the network system;

storing identification information on applicable aggregated path bypass destination routes, for each aggregated path of the aggregated paths;

deciding into which of multiple aggregated paths, to concentrate non-aggregated paths;

wherein the deciding including:

assigning the non-aggregated paths to candidate aggregated paths;

calculating an expectation value for an applicable aggregated path traffic bandwidth for each of the candidate aggregated paths, based on the acquired traffic information;

calculating an available capacity of the applicable aggregated path bypass destination routes, based on the expectation value;

selecting one aggregated path where the expectation value will not exceed the available capacity of the aggregated path bypass destination route; and aggregating the non-aggregated paths into the selected aggregated path.

* * * * *